(12) United States Patent
Ikeda

(10) Patent No.: US 10,983,400 B2
(45) Date of Patent: *Apr. 20, 2021

(54) LIQUID CRYSTAL DISPLAY DEVICE

(71) Applicant: Japan Display Inc., Tokyo (JP)

(72) Inventor: Daisuke Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,769

(22) Filed: Jun. 9, 2020

(65) Prior Publication Data

US 2020/0301181 A1    Sep. 24, 2020

Related U.S. Application Data

(63) Continuation of application No. 16/594,247, filed on Oct. 7, 2019, now Pat. No. 10,712,619, which is a continuation of application No. 16/118,588, filed on Aug. 31, 2018, now Pat. No. 10,473,984, which is a continuation of application No. 15/293,389, filed on
(Continued)

(30) Foreign Application Priority Data

Oct. 2, 2012   (JP) ................................. 2012-220114

(51) Int. Cl.
| | |
|---|---|
| G02F 1/1339 | (2006.01) |
| G02F 1/136 | (2006.01) |
| G02F 1/1333 | (2006.01) |
| G02F 1/1368 | (2006.01) |
| G02F 1/1345 | (2006.01) |

(52) U.S. Cl.
CPC ............ *G02F 1/1339* (2013.01); *G02F 1/136* (2013.01); *G02F 1/1368* (2013.01); *G02F 1/13394* (2013.01); *G02F 1/133345* (2013.01); *G02F 1/133351* (2013.01); *G02F 1/13454* (2013.01)

(58) Field of Classification Search
None
See application file for complete search history.

(56) References Cited

U.S. PATENT DOCUMENTS

| | | | |
|---|---|---|---|
| 2003/0038913 A1* | 2/2003 | Choo | G02F 1/1345 349/149 |
| 2003/0117570 A1* | 6/2003 | Kim | G02F 1/13394 349/153 |

(Continued)

*Primary Examiner* — Ryan Crockett
(74) *Attorney, Agent, or Firm* — Michael Best & Friedrich LLP

(57) ABSTRACT

At a corner of a TFT substrate where sealants are coated overlapping each other, a phenomenon that the sealants protrude into the display region is prevented by a structure that: the TFT substrate having an organic passivation film is formed as far as the outside of the display region. A groove-like organic passivation film removed portion is formed surrounding the display region. Since the sealants are coated overlapping each other at the corner, when a TFT substrate and a counter substrate are superposed at a predetermined gap, the width of the groove-like organic passivation film removed potion is made larger at the corner than the side in order to prevent the sealant from extending. Since an excessive sealant is absorbed in the groove-like organic passivation film removing portion of a larger width at the corner, the sealant can be prevented from protruding to the inside of the display region.

7 Claims, 8 Drawing Sheets

Related U.S. Application Data

Oct. 14, 2016, now Pat. No. 10,088,711, which is a continuation of application No. 14/755,364, filed on Jun. 30, 2015, now Pat. No. 9,500,910, which is a continuation of application No. 14/043,897, filed on Oct. 2, 2013, now Pat. No. 9,097,948.

(56) References Cited

U.S. PATENT DOCUMENTS

| | | | |
|---|---|---|---|
| 2007/0153211 A1* | 7/2007 | Whitehead, Jr. | G02F 1/1341 349/153 |
| 2008/0018848 A1* | 1/2008 | Iwato | G02F 1/133711 349/149 |
| 2009/0244422 A1* | 10/2009 | Okazaki | G02F 1/1339 349/42 |
| 2010/0149477 A1* | 6/2010 | Nagami | G02F 1/1339 349/138 |
| 2010/0157412 A1* | 6/2010 | Lee | G02F 1/1679 359/296 |
| 2011/0310344 A1* | 12/2011 | Yang | G02F 1/1339 349/153 |
| 2013/0010250 A1* | 1/2013 | Kira | G02F 1/1339 349/153 |
| 2013/0027648 A1* | 1/2013 | Moriwaki | G02F 1/1345 349/138 |
| 2014/0092357 A1* | 4/2014 | Chen | G02F 1/1333 349/155 |
| 2015/0062515 A1* | 3/2015 | Tomioka | G02F 1/133345 349/123 |
| 2015/0301370 A1* | 10/2015 | Moriwaki | G02F 1/1345 349/42 |
| 2015/0346556 A1* | 12/2015 | Hirota | G02F 1/1339 349/43 |

\* cited by examiner

LIQUID CRYSTAL DISPLAY DEVICE

CROSS REFERENCE TO RELATED APPLICATIONS

This application is a continuation of U.S. patent application Ser. No. 16/594,247 filed on Oct. 7, 2019, which, in turn, is a continuation of U.S. patent application Ser. No. 16/118,588 (now U.S. Pat. No. 10,473,984) filed on Aug. 31, 2018, which, in turn, is a continuation of U.S. patent application Ser. No. 15/293,389 (now U.S. Pat. No. 10,088,711) filed on Oct. 14, 2016, which, in turn, is a continuation of U.S. patent application Ser. No. 14/755,364 (now U.S. Pat. No. 9,500,910) filed on Jun. 30, 2015, which, in turn, is a continuation of U.S. patent application Ser. No. 14/043,897 (now U.S. Pat. No. 9,097,948) filed on Oct. 2, 2013. Further, this application claims priority from Japanese Patent Application JP 2012-220114 filed on Oct. 2, 2012, the entire contents of which are hereby incorporated by reference into this application.

BACKGROUND OF THE INVENTION

1. Field of the Invention

The present invention relates to a display device and it particularly relates to a liquid crystal display device that ensures the reliability of seal in spite of a narrow frame.

2. Description of the Related Art

A conventional liquid crystal display device includes a TFT substrate having a pixel electrode, thin film transistors (TFT), etc. formed in a matrix; a counter substrate disposed in facing relation to the TFT substrate and having a color filter, etc. formed at portions corresponding to the pixel electrodes of the TFT substrate; and liquid crystals put between the TFT substrate and the counter substrate. Images are formed by controlling the transmittance of light for every pixel by liquid crystal molecules.

Since the liquid crystal display devices are flat and light in weight, their application use has been extended in various fields. Small-sized liquid crystal display devices have been used generally for mobile phones, DSCs (Digital Still Cameras), etc. For the small-sized liquid crystal display devices, there is a strong demand for decreasing the outer dimension while ensuring a predetermined display region. Then, a distance between the end of the display region and the end of the outer contour, that is, a so-called, frame is narrowed. In this case, the area of a seal portion for sealing liquid crystals is decreased, resulting in a problem in ensuring the reliability of the seal portion.

It is inefficient to manufacture liquid crystal display panels on a one by one basis. Thus a method has been adopted of forming a plurality of liquid crystal display panels on a mother substrate, and then separating individual liquid crystal display panels from the mother substrate by scribing, etc. Further, as a method of sealing liquid crystals, a method of injecting liquid crystals through a sealing port has been used so far, but in this case it takes much time for injection of the liquid crystals. To cope with this, a so-called one drop fill (ODF) method has been adopted, in which a sealant is first formed to a TFT substrate or a counter substrate, and the liquid crystals are then sealed inside of the liquid crystal display panel while accurately controlling the amount of the liquid crystals in the inside of the sealant.

With the ODF method, the sealant is formed as a closed loop. While the sealant is coated by a dispenser or the like, portions of the sealant will overlap at the starting point and the end point of sealant coating, resulting in an increase in thickness of the sealant at the overlap potion. This may cause gap failure between the TFT substrate and the counter substrate or protrusion of the sealant toward the display region.

As a countermeasure for the problem with the sealant overlapping, JP-A-2010-145897 describes a configuration in which a recess is formed to an overcoat film formed to a counter substrate at portions corresponding to a starting point and an end point of the coated sealant, thereby absorbing an excessive sealant tee the portion.

SUMMARY OF THE INVENTION

JP-A-2010-145897 describes a method in which a coated sealant forms a closed loop in one liquid crystal display panel and the overlap portion of the sealant is present at the side of the liquid crystal display panel. In the configuration of JP-A-2010-145897, a recess is formed to the overcoat film of the counter substrate only at a portion corresponding to the overlap portion of the sealant.

JP-A-2010-145897 does not describe clear effects obtained when the overlap portion of the sealant is formed at the corner of the counter substrate. In particular, when the sealant is coated on a plurality of TFT substrates on a mother TFT substrate in which a plurality of TFT substrates are formed as illustrated in FIG. 5 of the present application, a cross portion of the sealants is formed at two positions on the liquid crystal display panel, but it is not certain whether the configuration described in JP-A-2010-145897 is applicable to such a configuration. Further, in the configuration of JP-A-2010-145897, it is necessary to partially cut out the periphery of an overcoat film. While general overcoat films can be formed by merely coating and curing, the overcoat film provided in JP-A-2010-145897 has to be formed with recessed portion by applying photolithography to the overcoat film resulting in increase the cost.

FIG. 5 illustrates an example of a coating configuration of a sealant 10 to a TFT substrate 100 on mother TFT substrate to which the invention is applied. In FIG. 5, a dotted line indicates a boundary for a portion where a counter substrate is disposed when a liquid crystal display panel is in a completed state. A portion below the dotted line is a portion where one sheet of the TFT substrate is present, serving as a terminal portion 150. The sealant 10 is formed at the periphery where a TFT substrate and a counter substrate overlap each other.

The configuration of the sealant in FIG. 5 has such a shape that the sealant 10 can be coated continuously by a dispenser or the like to a plurality of TFT substrates on a mother TFT substrate. For example, one sealant is coated in a U-shaped configuration along a cut line 50 of the TFT substrate from the right and then another sealant 10 is coated in an inverted U-shape configuration from the left. At portions C in FIG. 5, two sealants 10 are formed in an overlapping manner. With such a coating method, the sealant can be coated efficiently to a mother TFT substrate having many TFT substrates formed therein or to a mother counter substrate having many counter substrates formed therein.

In this case, the width of the sealant 10 increases in the overlap portion of the counter substrate and the TFT substrate. In FIG. 5, two sealants 10 are formed on both sides of the cut line 50 along the longer side. After coated on the TFT substrate, the sealants 10 are pressed to bond the TFT substrate and the counter substrate each other so as to define a predetermined gap and thus the sealants 10 are extended. As a result, the sealants 10 are formed over the cut line 50.

A display region 30 is formed inside of the coated sealant 10. A distance from the end of the display region 30 to the cut line 50 of the TFT substrate, that is, the width of a so-called frame is, for example, D1=0.8 mm at the longer side, D3=2.3 mm at the shorter side on the side of the terminal, and D2=1.0 mm at the shorter side opposite to the terminal. In a conventional manner for coating the sealant as above, sealing failure has occurred as follows. The sealant 10 protrudes to the display region 30 from the overlap portion of the sealants 10 in the corner portion.

FIG. 6 is a plan view near the cut line 50 at the corners of each TFT substrates on a mother TFT substrate. An organic passivation film 109 is formed as far as the outside of the display region 30. A peripheral circuit 40 such as a scanning line driving circuit is formed below the organic passivation film 109 at the outside of the display region 30. In FIG. 6, hatched portions show removed portions 20 of the organic passivation film.

The organic passivation film removed portions 20 are formed as three grooves at the periphery of the display region 30. Further, the organic passivation film removed portions 20 are formed each at a predetermined width with the cut line 50 of the individual TFT substrate being put therebetween. In FIG. 6, a portion indicated by a dotted line is a portion in which the sealant 10 is to be formed. As shown in FIG. 6, two sealants 10 overlap each other at the corners of the TFT substrates.

FIG. 7 is a cross sectional view along line B-B in FIG. 6. While FIG. 7 is a simplified cross sectional view, a detailed cross sectional view is to be described specifically in FIG. 1 in FIG. 7, an organic passivation film 109 is formed over a TFT substrate 100. Layers below the organic passivation film 109 are not illustrated. Organic passivation film removed portions 20 are formed to the organic passivation film 109 and each portion is formed as a groove. The end of the TFT substrate is formed as an organic passivation film removed portion 20. An inorganic insulation film 111 made of SiN, etc. is formed to cover the organic passivation film 20.

The TFT substrate 100 and the counter substrate 200 are bonded by a sealant 10, and liquid crystals 300 are sealed inside the sealant 10. In FIG. 7, the TFT substrate 100 and the counter substrate 200 are superposed with a predetermined gap formed between them in which the sealant 10 is in a pressed state. If the width of the sealant 10 increases a predetermined dimension or more when the sealant 10 is pressed, this may cause a failure that the sealant 10 protrudes to the display region.

In the TFT substrate 100 and the counter substrate 200, formed at the surface in contact with liquid crystals 300 is an alignment film which is not illustrated. When the alignment film is present between the sealant 10 and an inorganic insulation film 111, bonding strength of the sealant 10 is lowered. To deal with the deterioration of the sealant 10 mentioned above, as shown in FIG. 7, an organic passivation film removed portions 20 are formed in a groove shape and serve as dams for preventing the alignment film from flowing out to the outside. A portion A in FIG. 7 shows that such three dams are formed.

FIG. 7, since neither the alignment film nor the organic passivation film 109 is formed in a portion B, bonding strength between the sealant 10 and the TFT substrate 100 is great and the reliability of the seal can be ensured at the portion. As shown in FIG. 6 and FIG. 7, the width of the groove-like organic passivation film removed portion 20 has a width which is identical between the side and the corner. This is because the main purpose of the groove-like organic passivation film removed portions 20 is to provide a dam to the alignment film.

FIG. 8 is a plan view illustrating the state in which the width of the sealant 10 is enlarged at an overlap portion of the sealants 10, and the sealant 10 protrudes as far as the display region 30 as indicated by C in FIG. 5. FIG. 8 illustrates the presence of a sealant protrusion portion 31 in which a portion of the sealant 10 protrudes to the display region 30. Such a liquid crystal display panel is defective.

The subject of the present invention is to prevent the sealant from protruding to the display region while ensuring the reliability of the seal in a liquid crystal display panel having a narrowed frame.

The present invention intends to overcome the problems described above and specifically comprises the following configurations. That is, the present invention provides a liquid crystal display device comprising a TFT substrate including a region for display and having an organic passivation film formed thereover, a counter substrate disposed with a sealant formed in a seal portion between the TFT substrate and the counter substrate, and liquid crystals put between the TFT substrate and the counter substrate, in which, the organic passivation film is formed as far as the outside of a display region of the TFT substrate, the organic passivation film having a groove-like organic passivation film removed portion surrounding the display region in the seal portion, the width of the groove-like organic passivation film removed portion being larger at the corner than at the side, a peripheral circuit is formed in the seal portion of the TFT substrate, and a gap between the TFT substrate and the counter substrate in the seal portion is defined by a pillar spacer formed on the counter substrate and a pedestal of the organic passivation film formed over the TFT substrate.

According to the present invention, when sealant is formed to each of the TFT substrates in the mother TFT substrate, since the width of the groove-like organic passivation film removed portion also that serves as a dam for the alignment film is enlarged at the corner than at the side, even if the sealants are formed overlapping each other in the portion, the sealants do not protrude to the display region.

Further, when a peripheral driving circuit is formed in a layer below the organic passivation film removed portion, since the gap between the TFT substrate and the counter substrate at the seal portion is controlled by using a pillar spacer formed on the side of the counter substrates with the organic passivation film at a portion other than the organic passivation film removed portion being as a pedestal, the peripheral driving circuit is not injured.

Further, in the present invention, since no additional photolithographic step is necessary for preventing protrusion of the sealant at the corner, the cost does not increase when the invention is applied.

DESCRIPTION OF THE PREFERRED EMBODIMENTS

The present invention is to be described specifically by way of preferred embodiments.

First Embodiment

Figure 1:
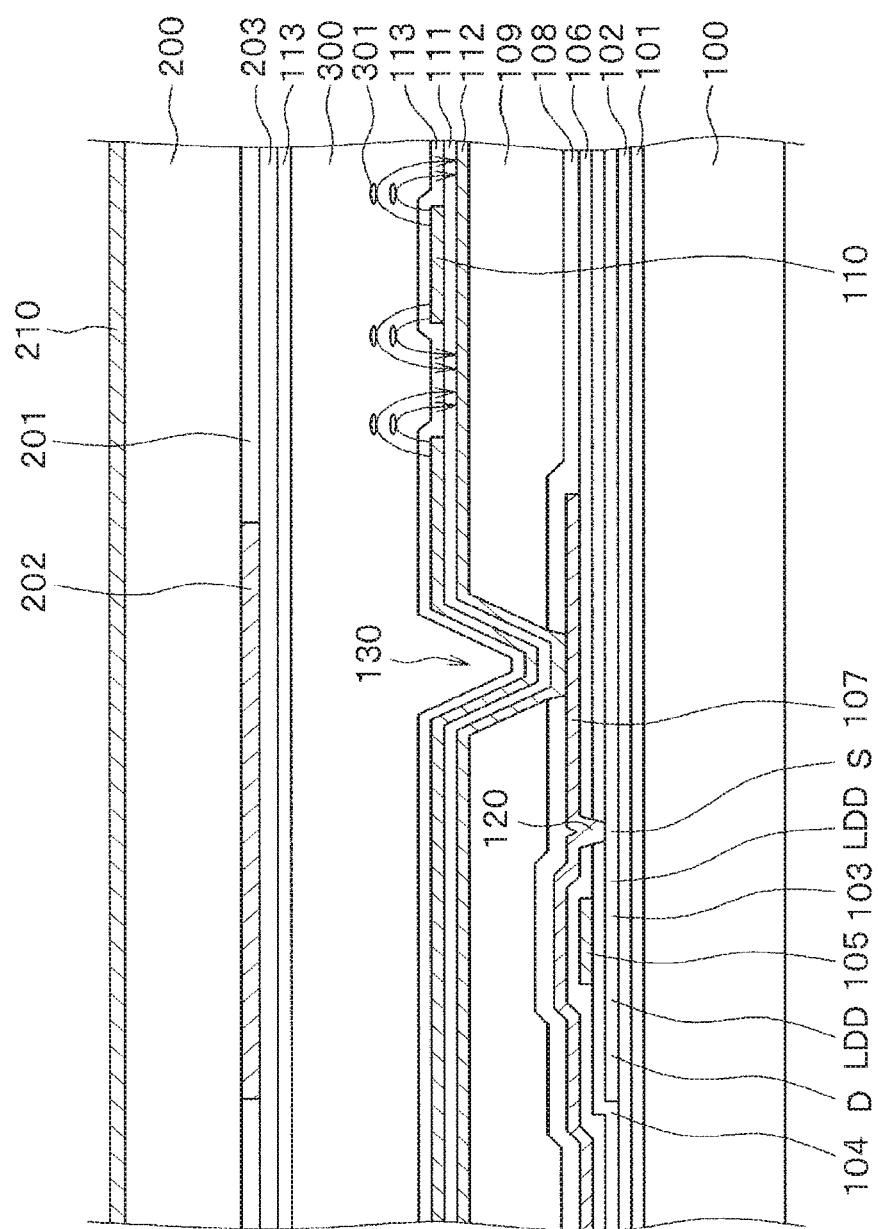
FIG. 1 is a cross-sectional view of a liquid crystal display device having a common electrode top structure to which the present invention is applied.

FIG. 1 is a cross sectional view of an IPS pixel region of a common electrode top structure to which the invention is applied. TFT in FIG. 1 is a so-called top gate TFT. As a semiconductor, LTPS (Low Temperature Poly-Si) is used. In addition to the common electrode top structure, IPS of a pixel electrode top structure is also present, to which the invention is also applicable.

On the other hand, when an a-Si semiconductor is used, a so-called bottom gate TFT is often used. In the subsequent description, while the top gate TFT is to be described as an example, the invention is applicable also to a case of using the bottom gate TFT. Also in a case of using the bottom gate TFT, the invention is applicable to any of a common electrode top type or a pixel electrode top type.

In FIG. 1, a first underlayer film 101 made of SiN and a second underlayer film 102 made of $SiO_2$ are formed over a glass substrate 100 by CVD (Chemical Vapor Deposition). The first underlayer film 101 and the second underlayer film 102 serve to prevent impurities in the glass substrate 100 from contaminating a semiconductor layer 103.

The semiconductor layer 103 is formed over the second underlayer film 102. The semiconductor layer 103 is provided by forming an a-Si film over a second underlayer film 102 by CVD and converting the a-Si film into a poly-Si film by laser annealing. The poly-Si film is patterned by photolithography.

A gate insulating film 104 is formed over the semiconductor film 103. The gate insulation film 104 is an $SiO_2$ film formed from TEOS (tetraethoxy silane). The film is also formed by CVD. A gate electrode 105 is formed over the insulation film 104. The gate electrode 105 is formed in the same layer and at the same time as a scanning signal line. The gate electrode 105 is formed, for example, of an MoW film. An Al alloy is used when it is necessary to lower the resistance of the gate interconnect 105.

The gate electrode 105 is patterned by photolithography and, during patterning, impurities such as phosphorus or boron are doped in the poly-Si layer to form a source S or a drain D in the poly-Si layer by ion implantation. Further, a LDD (Lightly Doped Drain) layer is formed between the channel layer of the poly-Si layer and the source S or the drain D by utilizing a photoresist upon patterning the gate electrode 105.

Then, a first interlayer insulation film 106 is formed by $SiO_2$ covering the gate electrode 105 or a gate interconnect. The first layer insulation film 106 is formed for insulating the gate interconnect 105 and a source electrode 107. A through hole 120 is formed in the first interlayer insulation film 106 and the gate insulation film 104 for connecting the source S of the semiconductor layer 103 and the source electrode 107. Photolithography for forming the through hole 120 in the first interlayer insulation film 106 and the gate insulation film 104 is performed simultaneously.

The source electrode 107 is formed over the first insulation film 106. The source electrode 107 is connected to a pixel electrode 112 by way of the through hole 130. In FIG. 1, the source electrode 107 is formed in a wide area so as to cover the TFT. On the other hand, the drain D of the TFT is connected to a drain electrode in a not illustrated portion.

The source electrode 107, the drain electrode, and a video signal line are formed in the same layer and at the same time. For example, an AlSi alloy is used for the source electrode 107, the drain electrode, and the video signal line (hereinafter typically represented by the source electrode 107) in order to lower the resistance. Since the AlSi alloy generates hillock or Al diffuses into other layers, a structure of sandwiching AlSi with a not illustrated barrier layer and a cap layer made of MoW is adopted.

An inorganic passivation film (insulation film) 108 is formed to cover the source electrode 107 to protect the entire TFT. The inorganic passivation film 108 is formed by CVD in the same manner as the first underlayer film 101. An organic passivation film 109 is formed to cover the inorganic passivation film 108. The organic passivation film 109 is formed of a photosensitive acrylic resin. The organic passivation film 109 can be formed, for example, of silicone resin, epoxy resin, polyimide resin, etc. in addition the acrylic resin. Since the organic passivation film 109 serves as a planarization film, the film 109 is formed to have a large thickness. The thickness of the organic passivation film 109 is 1 to 4 μm and is about 2 μm in most cases.

For establishing electric conduction between the pixel electrode 110 and the source electrode 107, a through hole 130 is formed in the inorganic passivation film 108 and the organic passivation film 109. A photosensitive resin is used for the organic passivation film 109. After coating of a photosensitive resin, when the resin is exposed, only the portion exposed to light is dissolved in a predetermined developer. That is, formation of a photoresist can be saved by using the photosensitive resin. After the through hole 130 is formed in the organic passivation film 109, the organic passivation film is baked at about 230° C. to complete the organic passivation film 109.

In the invention, the organic passivation film extends as far as the seal portion of the liquid crystal display panel and the organic passivation film removed portion is formed in a groove-like shape at the seal portion so that the film serves as a dam that prevents the alignment film from flowing to the outside. Further, in the invention, the width of the groove of the organic passivation film removed portion is made larger at the corner than at the side thereby preventing the sealants from protruding to the display region when the sealant are coated being overlapped each other.

A through hole is formed in the inorganic passivation film 108 by etching using the organic passivation film 109 as a resist. Thus, a through hole 130 for electric conduction between the source electrode 107 and the pixel electrode 110 is formed. Since the inorganic passivation film 108 is etched using the patterned organic passivation film 109 as a resist, it is not necessary to use an additional mask and the photolithographic step can be performed by one step. Since the organic passivation film 109 has a large thickness, the dimension of the hole is different between the upper part and the lower part of the through hole 130.

In FIG. 1, the upper surface of the thus formed organic passivation film 109 is planar. Amorphous ITO (Indium Tin Oxide) is deposited by sputtering over the organic passivation film 109, patterned by using a photoresist, and then etched with oxalic acid to pattern a pixel electrode 112. The pixel electrode 112 is formed also covering the through hole 130. The pixel electrode 112 is formed of ITO as a transparent electrode and has a thickness, for example, of 50 to 70 μm.

Then, a second interlayer insulation film 111 is deposited covering the pixel electrode 112 by CVD. The CVD is performed under the condition of temperature at about 200° C., so this CVD is referred to as low temperature CVD. The low temperature CVD is used for preventing denaturation of the already formed organic passivation film 109.

The second interlayer insulation film 111 is patterned by a photolithographic step in which the patterning is performed for a terminal portion and patterning for the through hole region is not necessary.

Amorphous ITO is sputtered over the second interlayer insulation film 111, and a comb-shaped common electrode 110 is formed by a photolithographic step. The thickness of the common electrode 110 is, for example, about 30 nm. The common electrode 110 is formed thinly so as to prevent alignment failure by rubbing shadow when the alignment film 113 formed over the common electrode 110 is applied with rubbing.

Figure 2:
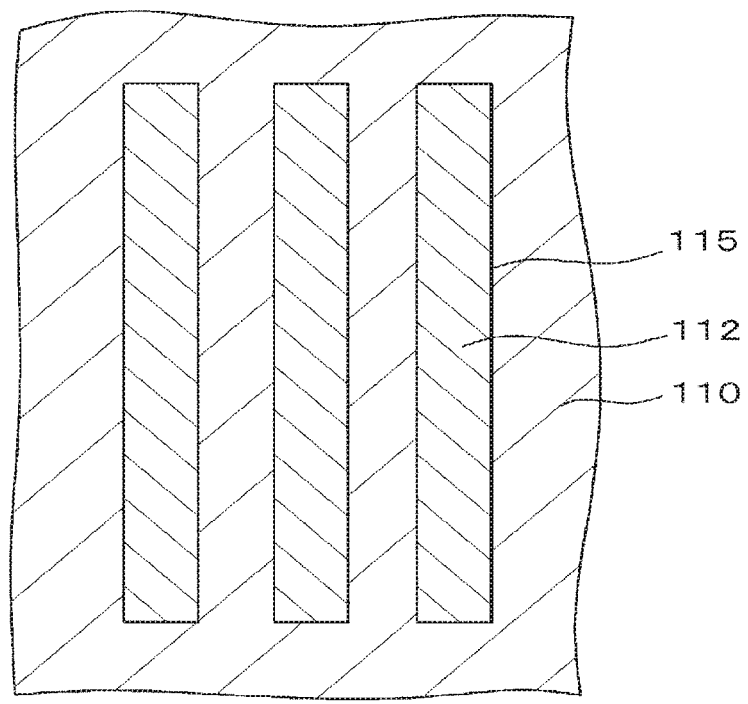
FIG. 2 is a plan view illustrating a relation between a pixel electrode and a common electrode.

FIG. 2 is a plan view illustrating a relation between the comb-shaped common electrode 110 and the pixel electrode 112 coated in a solid form. In FIG. 2, the common electrode 110 is disposed above the pixel electrode 112 with a not illustrated second interlayer insulation film being put therebetween. As illustrated in FIG. 1, lines of electric force extend from the upper surface of the common electrode 110 through slits 115 in the comb-shaped common electrode 110 to the pixel electrode 112 and liquid crystal molecules are rotated by the lines of electric force.

In FIG. 1, both the pixel electrode 112 and the common electrode 110 are formed in the region of the through hole 130. Accordingly, a light transmitting region can be formed also to the upper end of the through hole 130 or the inner wall of the through hole 130 when the liquid crystal molecules 301 can be aligned properly. Accordingly, compared with a pixel electrode top structure, the pixel region can be used more efficiently for forming images.

In FIG. 1, a counter substrate 200 is provided with the liquid crystal layer 300 being sandwiched between the substrates. A color filter 201 is formed to the inner side of the counter substrate 200. As the color filter 201, color filters of red, green, and blue are formed on every pixels to form color images. A black matrix 202 is formed between adjacent color filters 201 to improve the contrast of images. The black matrix 202 also serves as a light shielding film for the TFT to prevent photocurrent from flowing to the TFT.

An overcoat 203 is formed to cover the color filter 201 and the black matrix 202. Specifically, since each of the color filter 201 and the black matrix 202 has an uneven surface, the overcoat film 203 is adapted to have a flat surface. An alignment film 113 is formed over the overcoat film 203 for determining initial alignment of liquid crystals. Since FIG. 2 illustrates an IPS system, the common electrode is formed on the side of the TFT substrate 100 and not formed on the side of the counter substrate 200.

As illustrated in FIG. 1, a conduction film is not formed to the inner side of the counter substrate 200 in IPS. Then, the potential of the counter substrate 200 becomes instable. Further, external electromagnetic noises intrude to the liquid crystal layer 300 to give an undesired effect on images. For overcoming such a problem, an external conductive film 210 is formed to the outside of the counter substrate 200. The external conductive film 210 is formed by sputtering ITO, which is a transparent conductive film.

Figure 3:
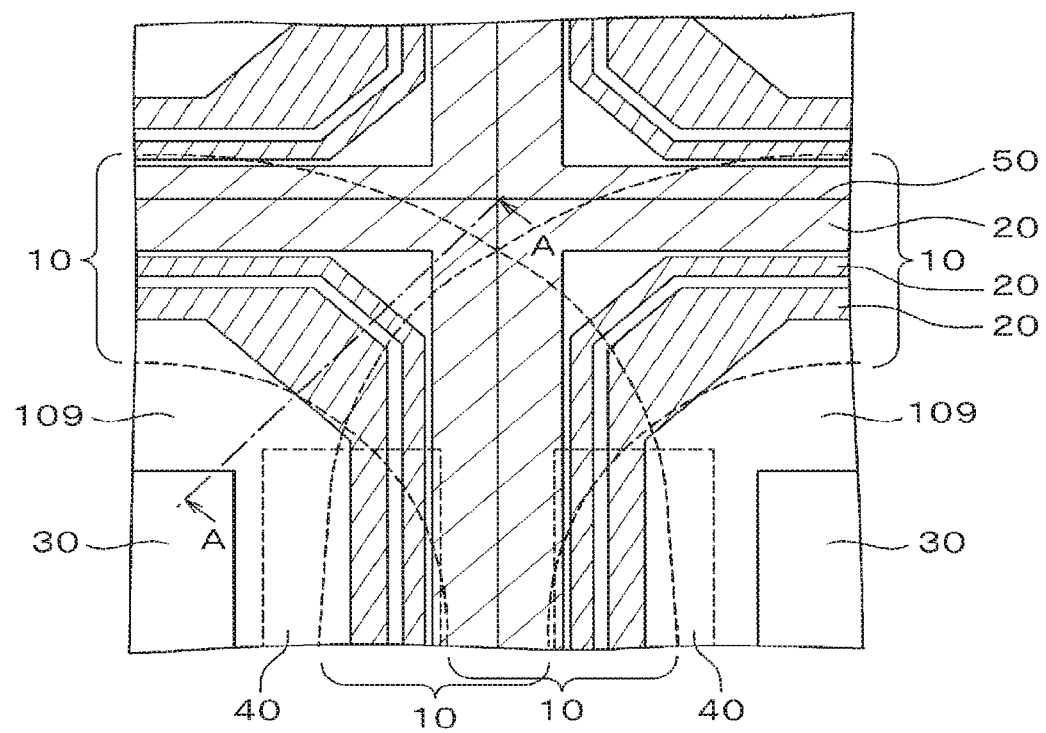
FIG. 3 is a plan view for the corner of a TFT substrate in the invention.

FIG. 3 is a plan view near cut lines 50 at corners of individual TFT substrates on a mother TFT substrate in the invention. The organic passivation film 109 is formed as far as the outside of the display region 30. A peripheral circuit 40 such as a scanning line driving circuit is formed below the organic passivation film 109 at the outside of the display region 30. In FIG. 3, hatched portions are the organic passivation film removed portions 20.

The organic passivation film removed portions 20 are formed as two grooves at the periphery of the display region 30. FIG. 3, the width of the grooves of the inner organic passivation film removed portions 20 is larger at corner than at side. In FIG. 3, the groove-like organic passivation film removed portions 20 are indicated only to portions of the TFT substrate, but the portions are actually formed surrounding the entire display region 30.

In FIG. 3, portions indicated by dotted lines are portions where the sealants 10 are formed. As illustrated in FIG. 3, two sealants 10 overlap each other at the corners of the TFT substrates. While the width of the sealant 10 is larger in the overlap portion of the two sealants 10, since the width of the grooves of the organic passivation film removed portions 20 are larger at the corners, protrusion of the sealant 10 to the display region 30 can be prevented also in the overlap portion of the sealants 10. Also in the invention, the groove-like organic passivation film removed portions 20 also serve as dams for preventing the alignment film from flowing to the outside.

Figure 4:
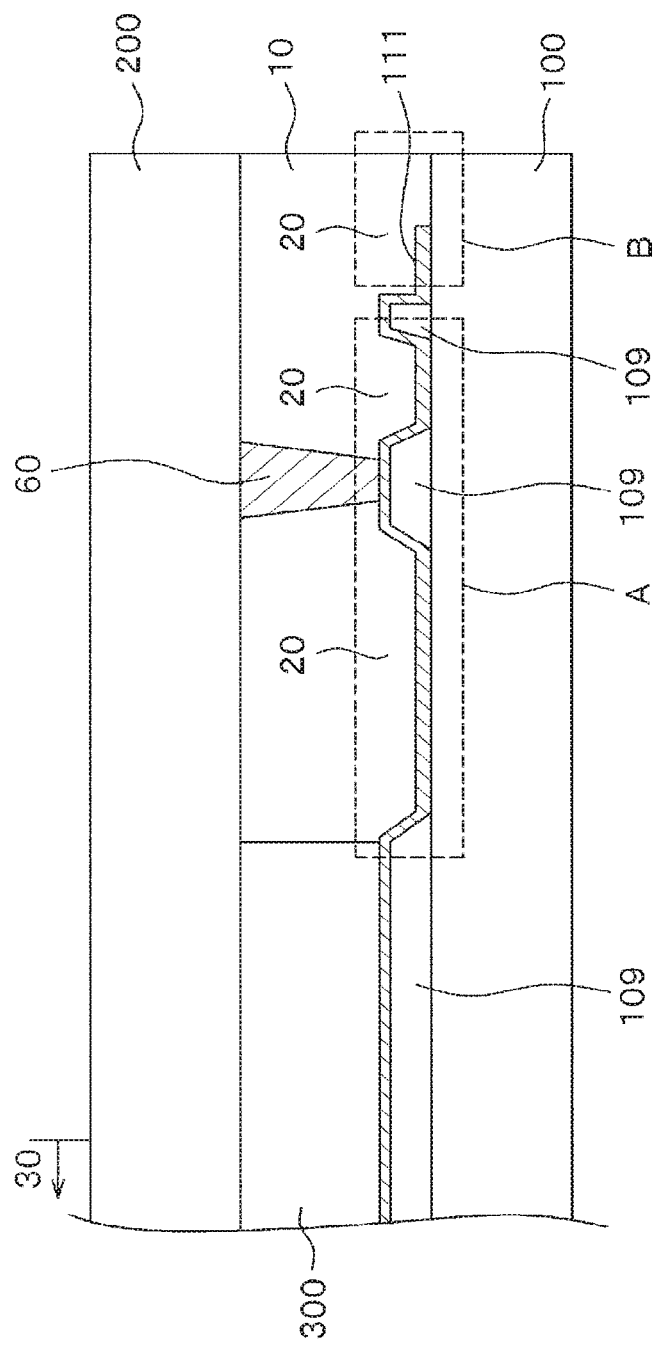
FIG. 4 is a cross-sectional view along line A-A in FIG. 3.

FIG. 4 is a cross-sectional view along line A-A in FIG. 3. In FIG. 4, an organic passivation film 109 is formed over a TFT substrate 100. While layers as illustrated in FIG. 1 are formed below the organic passivation film 109, such layers are not illustrated in FIG. 4.

An organic passivation film removed portions 20 are formed in the organic passivation film 109 and the portions form grooves. The groove-like organic passivation film removed portions 20 are formed by the number of two and the portions serve as dams or preventing the alignment film from flowing to the outside. In this embodiment, the width of the inner groove on the of the two grooves is made larger at the corner so that protrusion of the sealant 10 does not reach the display region 30 even when the sealants 10 are formed being overlapped each other.

The end of the TFT substrate 100 forms the organic passivation film removed portion 20. An inorganic passivation film 111 formed of SiN or the like is formed to cover the organic passivation film 109. The region A shown by a dotted line in FIG. 4 is a portion where groove-like passivation film removed portions 20 are formed which serve, in the invention, as dams for preventing the alignment film from flowing to the outside and preventing the sealant 10 from protruding into the display region 30 at a portion where the sealants 10 are coated overlap each other.

A dotted region B in FIG. 4 is an organic passivation film removed portion 20 and, since only the inorganic insulation film 111 is present, bonding strength between the sealant 10 and the TFT substrate 100 is strong to improve the reliability of the seal portion.

A pillar spacer 60 is formed from the counter substrate 200 for defining the gap between the TFT substrate 100 and the counter substrate 200 at the seal portion. While a black matrix, a color filter, an overcoat film, etc. are formed below the pillar spacer 60 in the counter substrate 200, they are not illustrated in FIG. 4. The gap between the TFT substrate 100 and the counter substrate 200 at the seal portion has been defined so far by glass fibers. However, in this embodiment, the peripheral circuit 40 is formed at the seal portion on the side of the TFT substrate 100. When the groove-like organic passivation film removed portion 20 is formed with a large width at the corner, the peripheral circuit 40 may possibly be damaged by glass fibers or beads at the portion.

In the invention, as illustrated in FIG. 4, since the gap between the TFT substrate 100 and the counter substrate 200 at the seal portion 10 is defined not by using the glass fibers, beads, etc. but by the pillar spacer 60 on the organic passivation film 109 being as a pedestal, a not illustrated peripheral circuit 40 formed below the organic passivation film 109 undergoes no damages.

Further, in the present invention, since the groove of the organic passivation film removed portion 20 for preventing the alignment film from flowing to the outside is used also as a concave portion for preventing the sealant 10 from protruding to the display region 30 in the overlap portion thereof, there is no requirement for additional step for practicing the configuration of the invention. It may suffice to merely change the mask for forming the groove-like organic passivation film removed portion 20 compared with the conventional case.

In FIGS. 3 and 4, while two groove-like organic passivation film removed portions 20 are used, they may be one or three or more. Importance is attached in that the width of the groove-like organic passivation film removed portions 20 are made larger near the corner where the coated sealants 10 overlap each other than that at the side. The width of the grooves of the organic passivation film removed portion 20 is preferably three times or more larger at the corner than at the side.

In FIG. 3, also a trigonal organic passivation film 109 is present at the corners of each of the TFT substrates partitioned by cut lines 50, that is, the organic passivation film 109 is present at the outermost portion in FIG. 4 can also be removed in accordance with the protrusion amount of the sealant 10.

Figure 5:
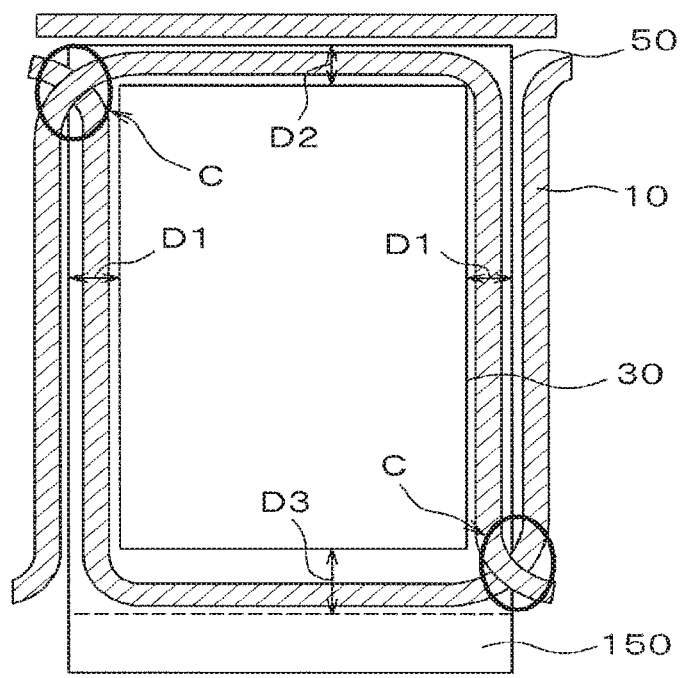
FIG. 5 illustrates a configuration of coating a sealant in the liquid crystal display device to which the invention is applied.
Figure 6:
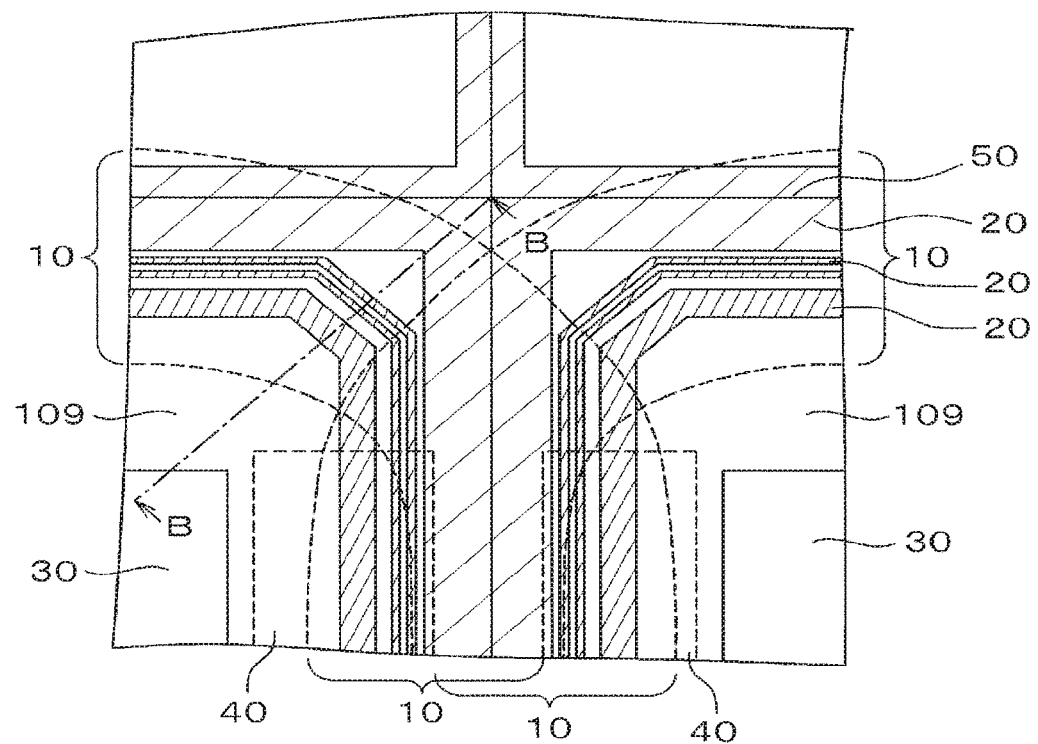
FIG. 6 is a plan view of a corner in a TFT substrate in a conventional embodiment.
Figure 7:
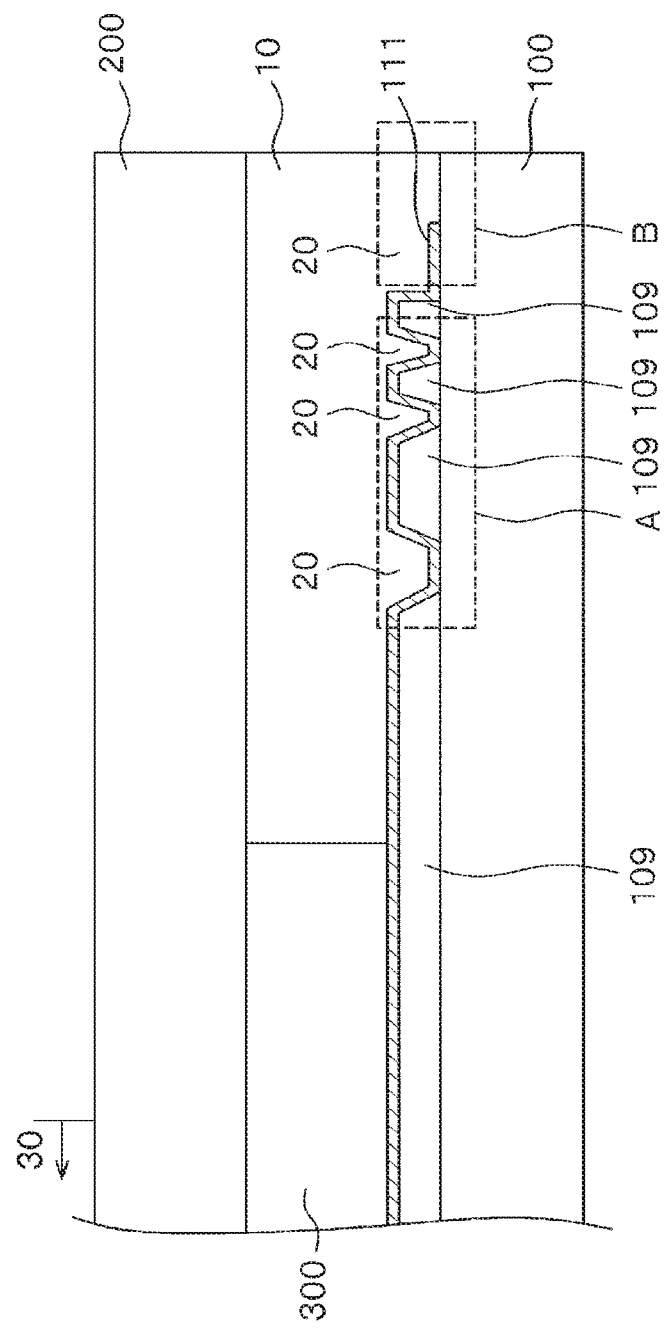
FIG. 7 is a cross sectional view along line B-B in FIG. 6.
Figure 8:
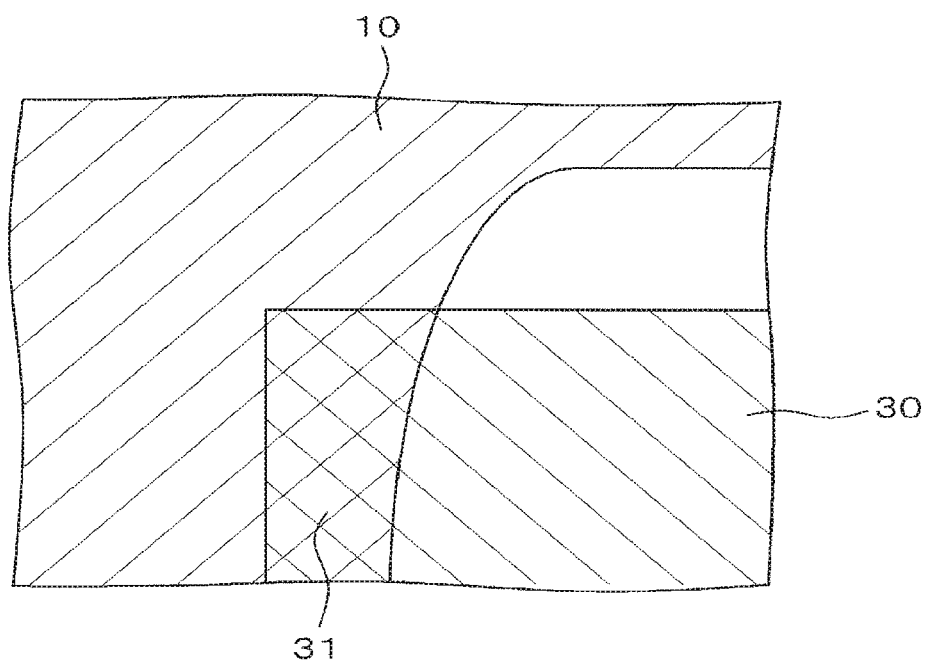
FIG. 8 is a plan view illustrating a state in which a sealant protrudes to a display region.

In FIG. 5, since the sealants 10 cross at the upper left corner and at the lower right corner of the TFT substrate, the width of the organic passivation film removed portion 20 is made larger than that at the side. However, since the sealants 10 do not cross at the upper right corner and the lower right corner, the width of the organic passivation film removed portions 20 at the upper right corner and the lower right corner may be made identical with the width at the side. In this case, the peripheral circuit 40 can be protected more widely by the organic passivation film 109 than in the upper left corner and the lower right corner where the sealants 10 cross each other.

In the foregoing description, it has been described that the organic passivation film is removed completely with the organic passivation film removed portions 20, but the organic passivation film 109 can be left thinly by using a half tone exposure technique to the organic passivation film removed portions 20. In this case, the peripheral circuit 40 can be protected by the thin organic overcoat film that remains in the removed portion while suppressing protrusion of the sealant 10.

What is claimed is:

1. A liquid crystal display device comprising:
   a TFT substrate including a short edge extending in a first direction, a long edge extending in a second direction, a corner connecting the short edge and the long edge, and an organic passivation film;
   a counter substrate; and
   a sealant which adheres to the TFT substrate and the counter substrate,
   wherein
   the organic passivation film has a planarization portion in a display region inside of the sealant, a first removed portion adjacent to the planarization portion, a second removed portion separated from the first removed portion, and a third removed portion separated from the second removed portion,
   the first removed portion, the second removed portion and the third removed portion are removed portions of the organic passivation film,
   the first removed portion is between the planarization portion and the second removed portion,
   the second removed portion is between the first removed portion and the third removed portion,
   the third removed portion is between the second removed portion and the long edge,
   the first removed portion, the second removed portion and the third removed portion overlap with the sealant,
   the first removed portion, the second removed portion and the third removed portion are located between the display region and the long edge,
   the first removed portion extends in the second direction, and bends near the corner in a third direction, which is different from the first direction and the second direction, to form a first bent portion,
   the second removed portion extends in the second direction, and bends near the corner in the third direction, to form a second bent portion, and
   the third removed portion extends in the second direction, and bends near the corner in the third direction, to form a third bent portion,
   wherein a width of the first removed portion in the first bent portion in a direction perpendicular to the third direction is bigger than a width of the first removed portion along the long edge in the first direction, or
   a width of the second removed portion in the second bent portion in a direction perpendicular to the third direction is bigger than a width of the second removed portion along the long edge in the first direction, or
   a width of the third removed portion in the third bent portion in a direction perpendicular to the third direction is bigger than a width of the third removed portion along the long edge in the first direction.

2. The liquid crystal display device of claim 1, wherein a width in the first direction of the first removed portion along the long edge is bigger than a width in the first direction of the second removed portion along the long edge, and is bigger than a width in the first direction of the third removed portion along the long edge.

3. The liquid crystal display device of claim 2, wherein a width of the first removed portion in the first bent portion in a direction perpendicular to the third direction is bigger than a width of the first removed portion along the long edge in the first direction.

4. The liquid crystal display device of claim 3, wherein the TFT substrate further includes a pixel electrode, a common electrode opposed to the pixel electrode, an inorganic insulation film between the pixel electrode and the common electrode, and an alignment film,
the pixel electrode and the common electrode are located in the display region, and
the pixel electrode and the common electrode are between the planarization portion and the alignment film.

5. The liquid crystal display device of claim 4, wherein an end of the inorganic passivation film outside of the display region is in the third removed portion.

6. The liquid crystal display device of claim 1, wherein
the TFT substrate further includes an inorganic insulation film between the seal and organic passivation film, and
the inorganic insulation film is in contact with the first to third removed portions.

7. The liquid crystal display device of claim 6, wherein
the TFT substrate further includes a gate scanning line driving circuit between the display region and the long edge, and
the first to third removed portion overlap with the gate scanning line driving circuit.

* * * * *